(12) United States Patent
Chang

(10) Patent No.: US 6,502,172 B2
(45) Date of Patent: *Dec. 31, 2002

(54) MEMORY ACCESSING AND CONTROLLING UNIT

(75) Inventor: Nai-Shung Chang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/045,433

(22) Filed: Jan. 11, 2002

(65) Prior Publication Data

US 2002/0059506 A1 May 16, 2002

Related U.S. Application Data

(63) Continuation of application No. 09/359,450, filed on Jul. 22, 1999, now Pat. No. 6,378,055.

(30) Foreign Application Priority Data

Mar. 2, 1999 (TW) ........................................ 88103133 A

(51) Int. Cl.$^7$ .............................................. G06F 12/02
(52) U.S. Cl. ........................ 711/167; 711/118; 711/143
(58) Field of Search ................................ 711/168, 118, 711/143, 167, 169, 105

(56) References Cited

U.S. PATENT DOCUMENTS

| | | | | |
|---|---|---|---|---|
| 5,355,467 A | * | 10/1994 | MacWilliams et al. | 711/146 |
| 5,454,107 A | * | 9/1995 | Lehman et al. | 711/153 |
| 5,553,310 A | * | 9/1996 | Taylor et al. | 370/462 |
| 5,761,708 A | * | 6/1998 | Cherabuddi et al. | 710/57 |
| 5,813,030 A | * | 9/1998 | Tubbs | 711/118 |
| 5,996,042 A | * | 11/1999 | Pawlowski et al. | 711/105 |
| 6,378,055 B1 | * | 4/2002 | Chang | 711/118 |

* cited by examiner

Primary Examiner—Hiep T. Nguyen
(74) Attorney, Agent, or Firm—J.C. Patents

(57) ABSTRACT

A memory accessing and controlling unit that controls the transfer of data between a CPU and a memory cluster. The memory accessing and controlling unit comprises a CPU interface circuit and a memory controlling circuit. When the CPU interface circuit picks up a data read request signal from the CPU, a corresponding internal data read request is forwarded to the memory controlling circuit. Next, the memory controlling circuit is sent out some controlling instructions to the memory cluster for reading out the requested data to the CPU. If the CPU also sends out an L1 write-back signal some time later, the memory controlling circuit immediately terminates the current reading operation so that data from the CPU can be written back to the memory cluster.

8 Claims, 16 Drawing Sheets

MEMORY ACCESSING AND CONTROLLING UNIT

CROSS-REFERENCE TO RELATED APPLICATION

This application is a continuation application of, and claims the priority benefit of, U.S. application Ser. No. 09/359,450 filed on Jul. 22, 1999 now U.S. Pat. No. 6,378,055.

BACKGROUND OF THE INVENTION

1. Field of Invention

The present invention relates to a memory accessing and controlling unit. More particularly, the present invention relates to a memory accessing and controlling unit that links a central processing unit (CPU) to a memory cluster. The memory accessing and controlling unit functions in such a way that the CPU can read a sequence of data from the memory without a need to wait for L1 write-back signals to return from the CPU. Hence, time delay due to a memory read operation is reduced.

2. Description of Related Art

Due to the rapid progress in computer technologies, the operating speeds of most computer systems are very fast. Aside from a general increase in the working frequency of a CPU, the efficiency of other associated components inside a computer also increases correspondingly. For example, the accessing rate of a main memory such as dynamic access memory (DRAM) in a computer system has increased. Furthermore, the method of memory control has also improved tremendously. From the earlier version of DRAM control, a fast page mode (FPM) and an extended data out (EDO) mode of operation are developed. Now, the most popular memory control methods is the synchronized DRAM (SDRAM).

FIG. 1 is a block diagram showing a computer system having a conventional memory accessing and controlling unit. The computer system includes a CPU 110, a memory accessing and controlling unit 120 and a memory cluster 130. Through the memory accessing and controlling unit 120, the CPU 110 is able to access the memory cluster 130. One end of the memory accessing and controlling unit 120 has a few signal lines that couple with the CPU 110. Similarly, the other end of the memory accessing and controlling unit 120 has a few signal lines that couple with the memory cluster 130.

The CPU 110 needs to access data in the memory cluster 130 through the memory accessing and controlling unit 120. The unit 120 must be able to receive a data request signal from the CPU 110 and then send appropriate controlling signals to the memory cluster 130. Therefore, the CPU 110 is able to write into or read from the memory cluster 130.

The memory accessing and controlling unit 120 is further divided into a CPU interface circuit 121 and a memory controlling circuit 122. The CPU interface circuit 121 is responsible for processing the signals coming from and transmitting to the CPU 110. When the CPU 110 needs to access the memory cluster 130, a data request signal is sent from the CPU 110 to the CPU interface circuit 121. Next, signals are sent from the CPU interface circuit 121 to the memory controlling circuit 122. Finally, appropriate signals are sent from the memory controlling circuit 122 to the memory cluster 130 for controlling the memory read/write operation. Consequently, data from the CPU 110 can be written into the memory cluster 130 or data can be read back from the memory cluster 130 by the CPU 110.

Signal lines that link the CPU interface circuit 121 with the CPU 110 include ADS, REQ, HITM, HD, HTRDY, DRDY and DBSY. Signal on the ADS line comes from the CPU 110. A low voltage in the ADS line implies that the CPU 110 needs to access data in the memory cluster 130. Signal on the REQ line is also sent by the CPU 110 requesting that data be read from or written to the memory cluster 130. The HITM line is a signal line for the CPU 110 to send out an L1 write-back signal. A low potential at the HITM line implies that the data that need to be read by the CPU 110 have already been changed inside the cache memory 112. Therefore, the changed data need to be written back to the memory cluster 130 first.

Signals DRDY and DBSY are data ready and data busy signals, respectively. Both the DRDY and the DBSY signals are sent by the CPU interface circuit 121 to the CPU 110. When the DRDY and the DBSY lines are both at low potential, it means that data are ready to flow to the CPU 110 through the data lines HD. The signal on the signal line HTRDY is provided by the CPU 110. A positive signal there implies that the data on the data lines HD are sent by the CPU 110.

Signal lines that link the CPU interface circuit 121 with the memory controlling circuit 122 include DADS and DAT. Signal on the signal line DADS is an internal data request signal that reciprocates the signal produced by the ADS signal from the CPU 110. The DAT lines are just data lines.

Signal lines that link the memory controlling circuit 122 with the memory cluster 130 include CMD and MD. Signals on the signal lines CMD are instructions for controlling the memory cluster 130. The MD lines are just data lines used for the transfer of data between the memory cluster 130 and the memory controlling circuit 222.

In general, a CPU sends out a burst of data read requests from time to time. However, if there are any L1 write-back signals, they are not on the signal line HITM until a few clock cycles later. When the CPU sends out an L1 write-back signal, data requested by the CPU must first be written back to the memory cluster. Since the L1 write-back signals are returned a few clock cycles after the issue of the read request signal from the CPU, the conventional controlling unit idles for a few more cycles to be sure that no L1 write-back signals return. Hence, internal data request signals are submitted by the CPU interface circuit a few cycles later, and there is a delay in the return of data to or from the CPU.

Since the conventional memory accessing and controlling unit opt for waiting a few cycles after receiving a data request signal (to be sure that no L1 write-back signal is returned), a few clock cycles are wasted in each request. According to the statistics regarding data transfer between a CPU and its memory in a computer system, data is read by the CPU from memory about 60% of the time. Updated data is written back to the memory from the cache about 15% of the time. In the remaining time, data in the CPU is written to the memory. Consequently, by increasing the processing efficiency of CPU memory read requests, efficiency of the entire computer system may be improved.

In light of the foregoing, there is a need to provide a memory accessing and controlling unit capable of eliminating the wait cycles after the data read request signals are issued, thereby increasing the overall efficiency of a computer system.

SUMMARY OF THE INVENTION

Accordingly, the present invention is to provide a memory accessing and controlling unit having a CPU interface circuit and a memory controlling circuit. The CPU interface circuit is capable of sending out an internal data read request signal to the memory controlling circuit for reading data off a memory cluster after a data read request signal is submitted by the CPU, but before the expiration of the pre-defined period for the return of an L1 write-back signal. Hence, the delay resulting from the CPU waiting for the return of an L1 write-back signal is reduced and the overall efficiency of the computer system is improved.

To achieve these and other advantages and in accordance with the purpose of the invention, as embodied and broadly described herein, the invention provides a memory accessing and controlling unit. The memory accessing and controlling unit is coupled to a CPU and a memory cluster. The CPU accesses data in the memory cluster through the memory accessing and controlling unit. Internally, the memory accessing and controlling unit can be further divided into a CPU interface circuit and a memory controlling circuit. The CPU interface circuit is coupled to the CPU and the memory controlling circuit, and the memory controlling circuit is coupled to the memory cluster.

Operation of the CPU interface circuit is as follows. After the CPU interface circuit receives a data read request signal from the CPU, the CPU interface circuit submits an internal data read request signal to the memory controlling circuit accordingly. Later, when the CPU interface circuit picks up an L1 write-back signal from the CPU, the CPU interface circuit submits a stop signal to the memory controlling circuit.

The memory controlling circuit is a device that picks up the internal data read signal as well as the stop signal submitted by the CPU interface circuit. According to the internal data read signal and the stop signal, the memory controlling circuit operates as follows. First, the required data is retrieved from the memory cluster according to the internal data read request signals. As soon as the memory controlling circuit receives a stop signal, processing of the previous internal data read request is immediately stopped so that the write-back data submitted by the CPU can be written into the memory cluster. If the stop signal arrives after the memory controlling circuit has read-out the data from the memory cluster, the read-out data is discarded. Similarly, the write-back data submitted by the CPU is then written back into the memory cluster.

According to one preferred embodiment of this invention, the CPU sends out an L1 write-back signal after the data read request signal is submitted for a predefined period. In addition, the CPU submits the write-back data after the L1 write-back signal is already out for yet another predefined period. On the other hand, the CPU interface circuit submits a stop signal to the memory controlling circuit in response to the L1 write-back signal only when the memory controlling circuit is transmitting data back to the CPU interface circuit.

According to yet another preferred embodiment of this invention, the memory cluster includes a synchronized dynamic random access memory (SDRAM).

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 5A to 9A are timing diagrams of the signals related to the operation of a conventional memory accessing and controlling unit under various operating conditions;

FIGS. 5B to 9B are timing diagrams of the signals related to the operation of the memory accessing and controlling unit of this invention under the same operating conditions as described in FIGS. 5A to 9A.

DESCRIPTION OF THE PREFERRED EMBODIMENTS

Figure 1:
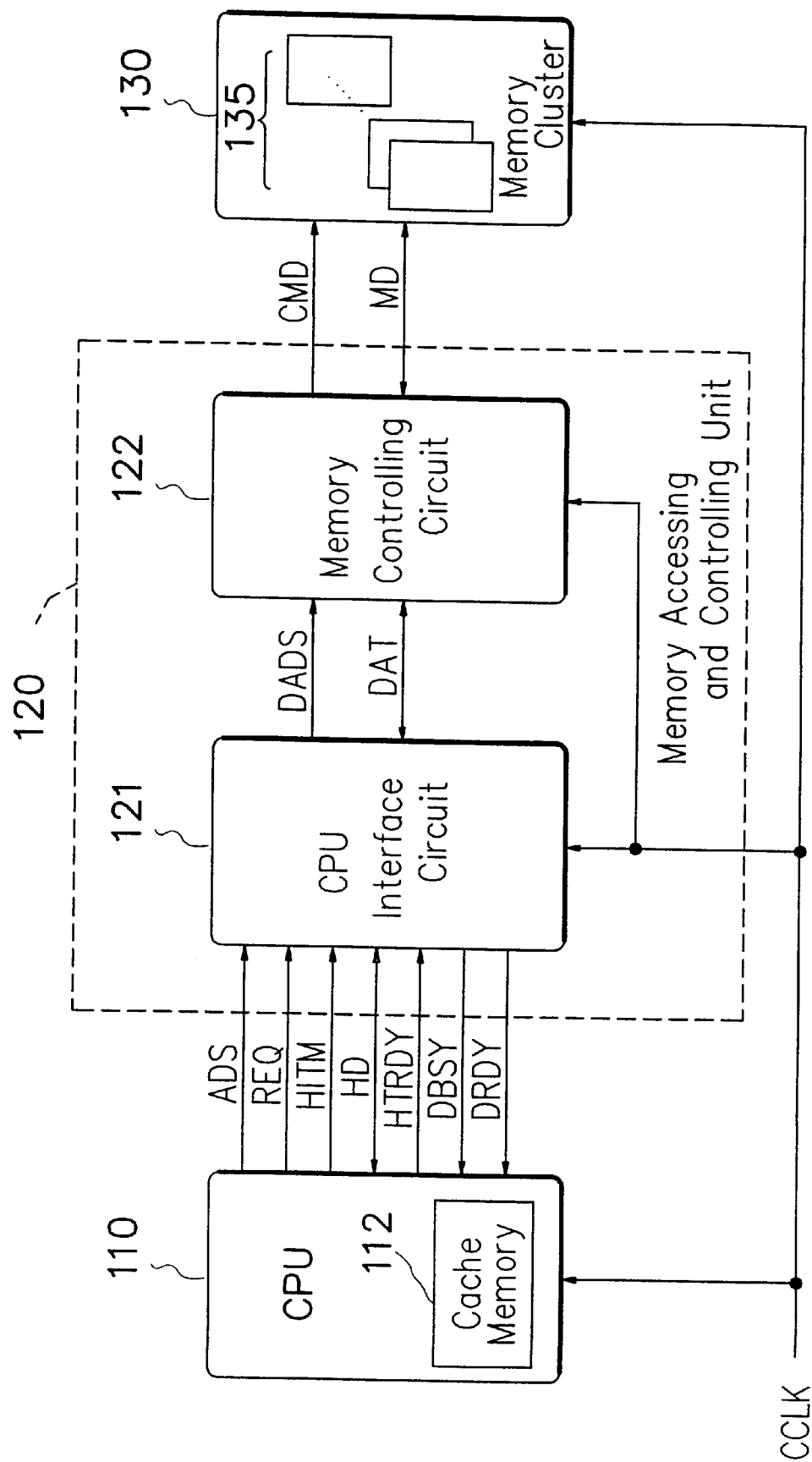
FIG. 1 is a block diagram showing a computer system having a conventional memory accessing and controlling unit.

Reference will now be made in detail to the present preferred embodiments of the invention, examples of which are illustrated in the accompanying drawings. Wherever possible, the same reference numbers are used in the drawings and the description to refer to the same or like parts.

Figure 2:
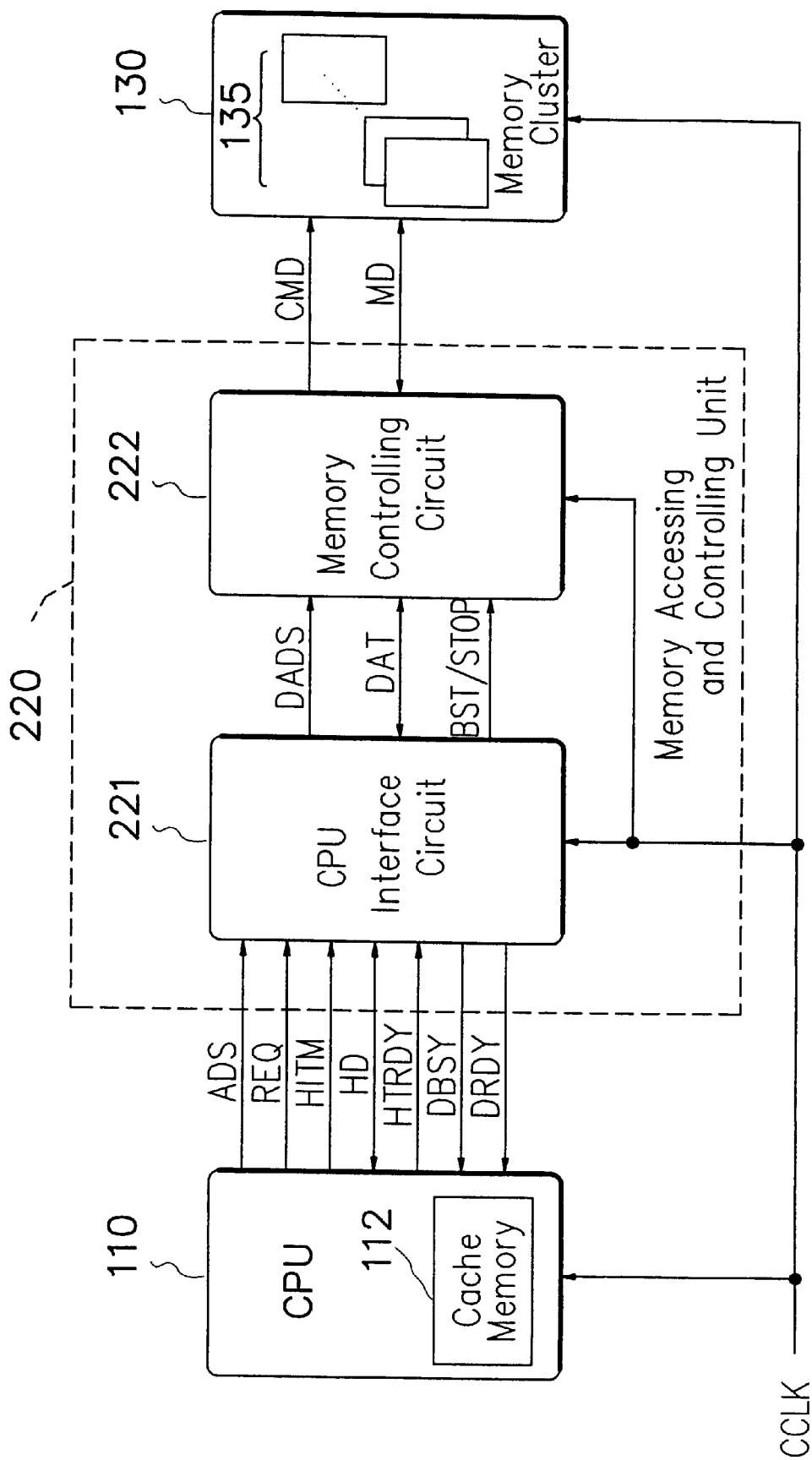
FIG. 2 is a block diagram showing a computer system having a memory accessing and controlling unit according to this invention.

FIG. 2 is a block diagram showing a computer system having memory accessing and controlling unit according to this invention.

As shown in FIG. 2, CPU and the memory cluster are identical to the one in FIG. 1. Hence, elements within those regions are labeled identically. The memory accessing and controlling unit 220 serves as a means of controlling the transfer of data from the memory cluster 130 to the CPU 110. The CPU 110 further includes a cache memory 112. For example, the Intel Pentium II is one such type of CPU. In addition, SDRAM can be used as memory in the memory cluster 130. At one end of the memory accessing and controlling unit 220, a plurality of signal lines is coupled to a CPU 110. At the other end, a plurality of signal lines is also coupled to a memory cluster 130. The CPU 110 needs to access data in the memory cluster 130 through the memory accessing and controlling unit 220. Therefore, the unit 220 must be able to receive a request signal from the CPU 110 and then send appropriate controlling signals to the memory cluster 130 so that the CPU 110 is able to write into or read from the memory cluster 130.

The memory accessing and controlling unit 220 is further divided into a CPU interface circuit 221 and a memory controlling circuit 222. The CPU interface circuit 221 is responsible for processing the signals between the CPU interface circuit 221 and the CPU 110. When the CPU 110 needs to access the memory cluster 130, a data request signal is sent from the CPU 110 to the CPU interface circuit 221. Next, a signal is sent from the CPU interface circuit 221 to the memory controlling circuit 222. Finally, a control signal is sent from the memory controlling circuit 222 to the memory cluster 130. Consequently, data can be written into the memory cluster 130 or data can be read from the memory cluster 130.

Although the memory accessing and controlling unit 220 of this invention has a structural design similar to a conventional unit design, the controlling unit 220 is able to optimize its operations with matching signals. The following is a description of the signal lines between each electronic block. However, to simplify description, only the signal lines that are related to this invention are indicated. In general, the signal lines mentioned in this invention may be labeled differently in other computer systems. In addition, there may be some more signal lines linking up various blocks. However, these signal lines should be familiar to those skilled in the art.

As shown in FIG. 2, the entire electronic system is synchronized with the clock pulse signal CCLK. Signal lines that link the CPU interface circuit 221 with the CPU 110 include ADS, REQ, HITM, HTRDY, HD, DRDY and DBSY. Depending on actual circuit requirement, each of the signal line may include more than one signal line. For example, the signal line HD should comprise a number of data lines. In fact, if the CPU 110 has a 64-bits architecture, the number of HD data lines should be 64. In general, each of these signal lines can be chosen to be either active high or active low. Hence, the following illustration is just one of the many possible examples.

Signal on the ADS line comes from the CPU 110. A low voltage in the ADS line implies that the CPU 110 needs to access data in the memory cluster 130. Signal on the REQ line is also sent by the CPU 110 requesting that data be read from or written to the memory cluster 130. The HITM line is a signal line for the CPU 110 to send out an L1 write-back signal. A low potential at the HITM line implies that the data that need to be read by the CPU 110 have been changed inside the cache memory 112. Therefore, the changed data needs to be written back to the memory cluster 130, first. The signal on the signal line HTRDY is provided by the CPU 110. A positive signal there implies that the data on the data lines HD are sent by the CPU 110. Signals DRDY and DBSY are data ready and data busy signals, respectively. Both the DRDY and the DBSY signals are sent by the CPU interface circuit 121 to the CPU 110. When the DRDY and the DBSY lines are both at low potentials, it means that data are ready to flow to the CPU 110 through the data lines HD.

Signal lines that link the CPU interface circuit 221 with the memory controlling circuit 222 include DADS, DAT, and BST/STOP. Signal on the signal line DADS reciprocates the signal produced by the ADS signal from the CPU 110. A low potential on the signal line DADS means that the CPU interface circuit 221 is going to send out an internal data access request to the memory controlling circuit 222. The BST/STOP signal is a stop signal sent by the CPU interface circuit 221 to the memory controlling circuit 222. The stop signal is sent when the CPU 110 issues an L1 write-back signal via the signal line HITM requiring data to be written back to the memory cluster 130. In fact, the BST/STOP signal is a request asking the memory controlling circuit 222 to stop processing the previously submitted internal data read request so that the CPU can write data back into the memory cluster 130. The DAT lines are just data lines.

Signal lines that link the memory controlling circuit 222 with the memory cluster 130 include CMD and MD. Signals on the signal lines CMD are instructions for controlling the memory cluster 130. The instructions include pre-charging, activating, read or write. MD lines are just data lines used for data transfer between the memory clusters 130 and the memory controlling circuit 222.

Figure 3:
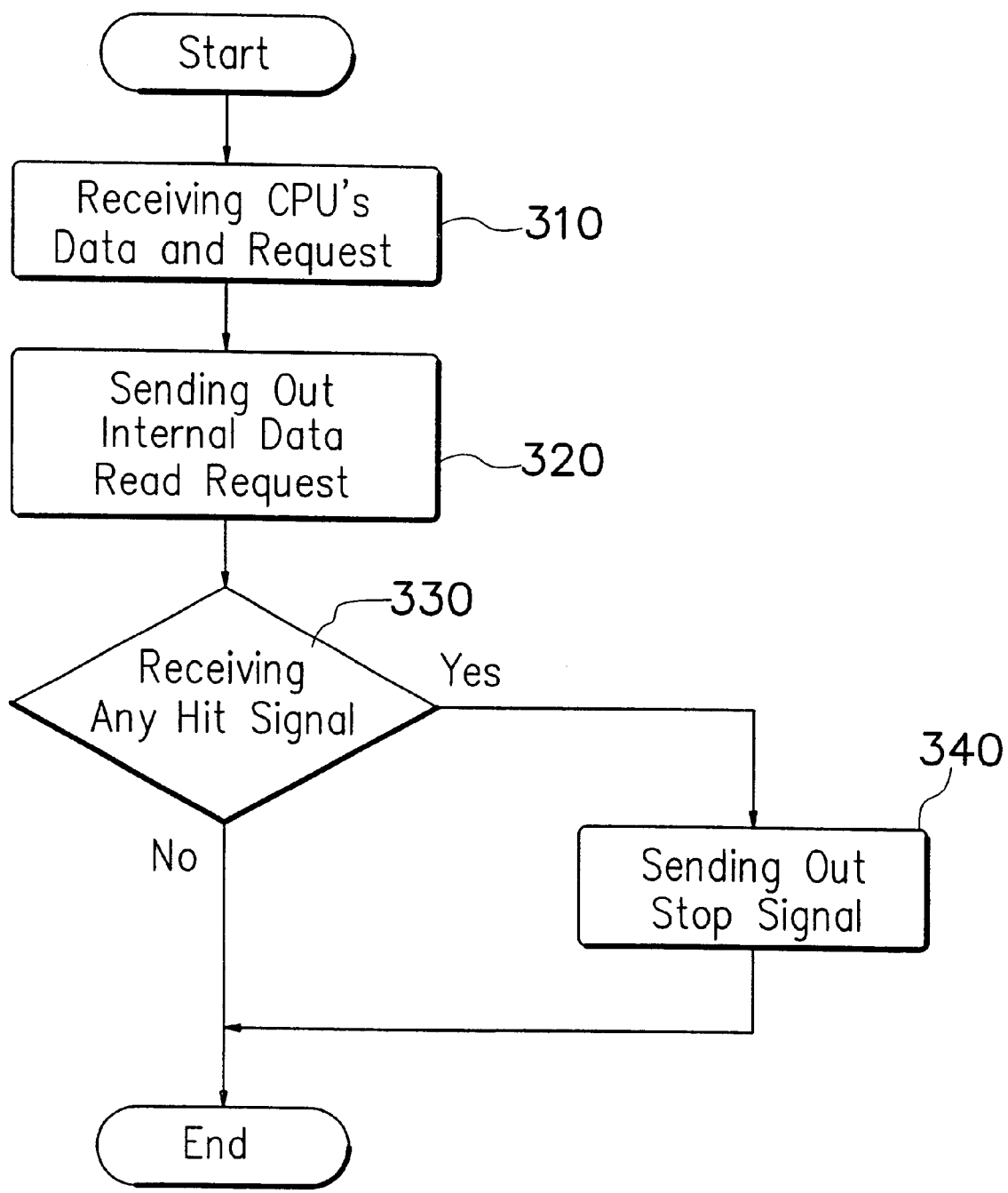
FIG. 3 is a flow chart showing the series of steps carried out by the CPU interface circuit of this invention.
Figure 4:
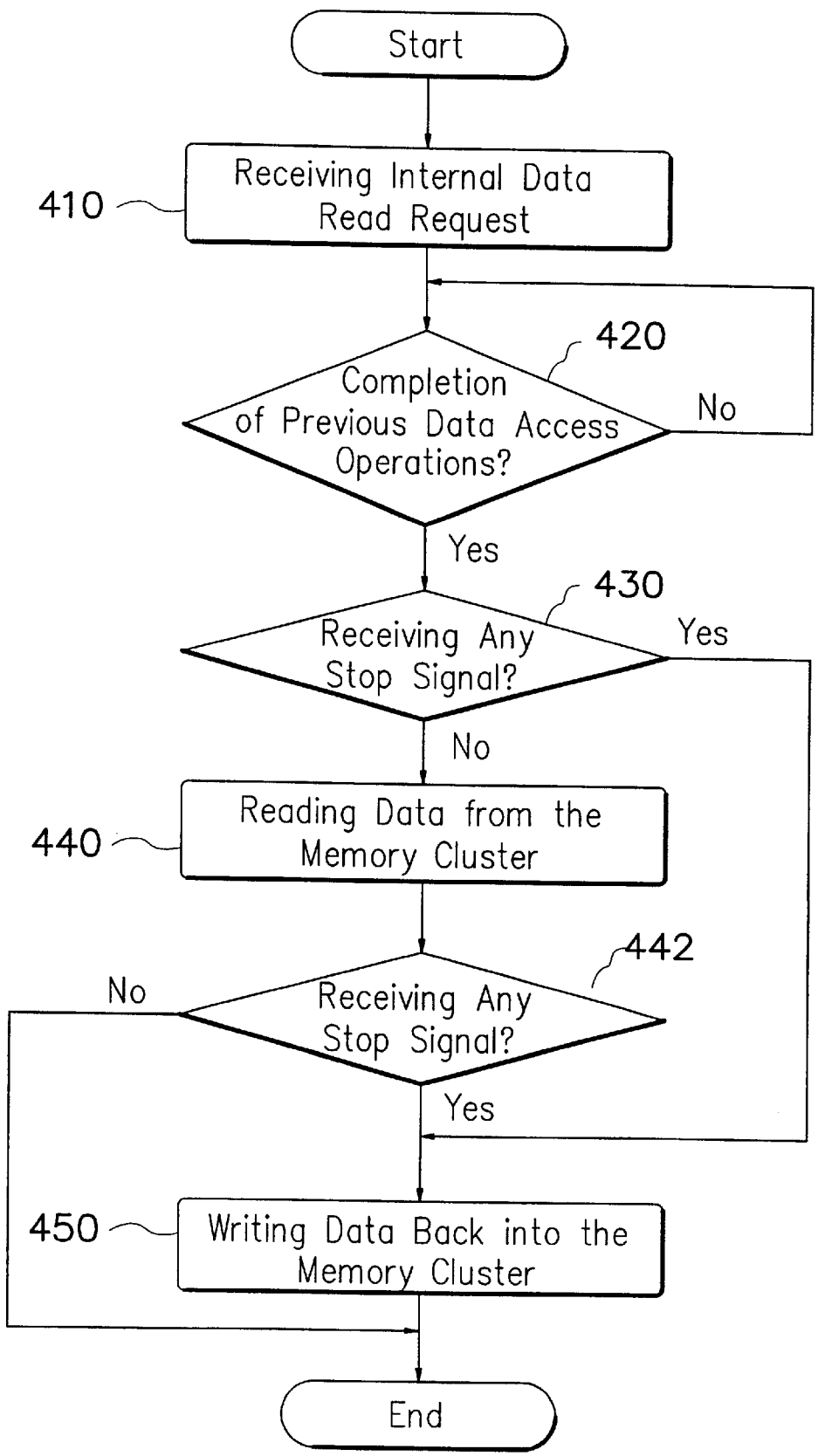
FIG. 4 is a flow chart showing the series of steps carried out by the memory controlling circuit of this invention.

FIG. 3 is a flow chart showing the series of steps carried out by the CPU interface circuit and FIG. 4 is a flow chart showing the series of steps carried out by the memory controlling circuit of this invention. Since the purpose of this invention is to improve the efficiency of data read request from a. CPU, data read requests are the main point of discussion.

FIG. 3 is a flow chart showing the series of steps carried out by the CPU interface circuit 221 of the memory accessing and controlling unit 220.

First, in step 310, the CPU interface circuit 221 picks up data read request signals from signal lines ADS and REQ submitted by the CPU 110. In most cases, a series or a burst of data read request signals are consecutively issued by the CPU 110. Next, in step 320, the CPU interface circuit 221 sends out an internal data request signal to the memory controlling circuit 222 via the signal line DADS that corresponds to the CPU data request. If the CPU 110 sends out a burst of data read requests, the CPU interface circuit 221 sends out a matching number of internal data read requests to the memory controlling circuit 222. Here, unlike the conventional scheme of operation, there is no need for the CPU 110 interface circuit 221 to wait for the possible arrival of an L1 write-back signal from the CPU 110. The corresponding internal data read request is issued immediately.

Next, in step 330, the CPU interface circuit 221 intercepts any L1 write-back signal from the CPU 110 via the signal line HITM. If the CPU interface circuit 221 does not receive any L1 write-back signal after a pre-defined period, nothing is done. On the other hand, if the CPU 110 does receive an L1 write-back signal from the CPU 110, which means some data has to be written back to the memory. In that case, step 340 is carried out by issuing a stop signal to the memory controlling circuit 222 via the signal line BST/STOP. The stop signal is a signal requesting that the memory controlling circuit 222 stop processing a previously submitted internal data read request so that the CPU 110 is able to write data back into the memory cluster 130.

FIG. 4 is a flow chart showing the series of processing steps carried out by the memory controlling circuit 222 after receiving the signals from the CPU interface circuit 221.

First, in step 410, the memory controlling circuit 222 is activated by the internal data read request signals coming from the CPU interface circuit 221 via the signal lines DADS. Next, in step 420, the memory controlling circuit 222 checks to see if the operations required by the previous data access request are completed or not. If the operations required by the previous data access request are still incomplete, the memory controlling circuit 222 has to wait for the end of those data processing operations in the memory cluster 130 before the next data access request can be carried out.

After the previous data access request is completed, step 430 is carried out to determine if a stop signal has arrived via the signal line BST/STOP. If the memory controlling circuit 222 picks up a stop signal from the CPU interface circuit 221, step 450 is carried out to stop processing a previous data read request. Then, write-back data from the CPU 110 is able to write to the memory cluster 130. On the other hand, if no stop signal is received in step 430, because no write-back is required or the L1 write-back signal for write-back has not come yet, step 440 is carried out. In step 440, data continue to be read from the memory cluster 130 according to internal data read request. For example, if the memory cluster 130 is SDRAM and the current data lies in a page that differs from the previous data access request, the memory controlling circuit 222 must issue a pre-charge and an activate signal to the memory clusters 130 via the signal line CMD first. Hence, the required page is opened before the actual data read instruction is issued to the memory cluster 130.

Next, step 442 is carried out after data is read from the memory cluster 130. In step 442, the memory controlling circuit 222 again determines if it has intercepted a stop signal or not. If no stop signal is received, nothing more is done. On the other hand, if a stop signal is received, step 450 is carried out by discarding the read data and then writing the write-back data from the CPU 110 into the memory cluster 130.

Figure 10:
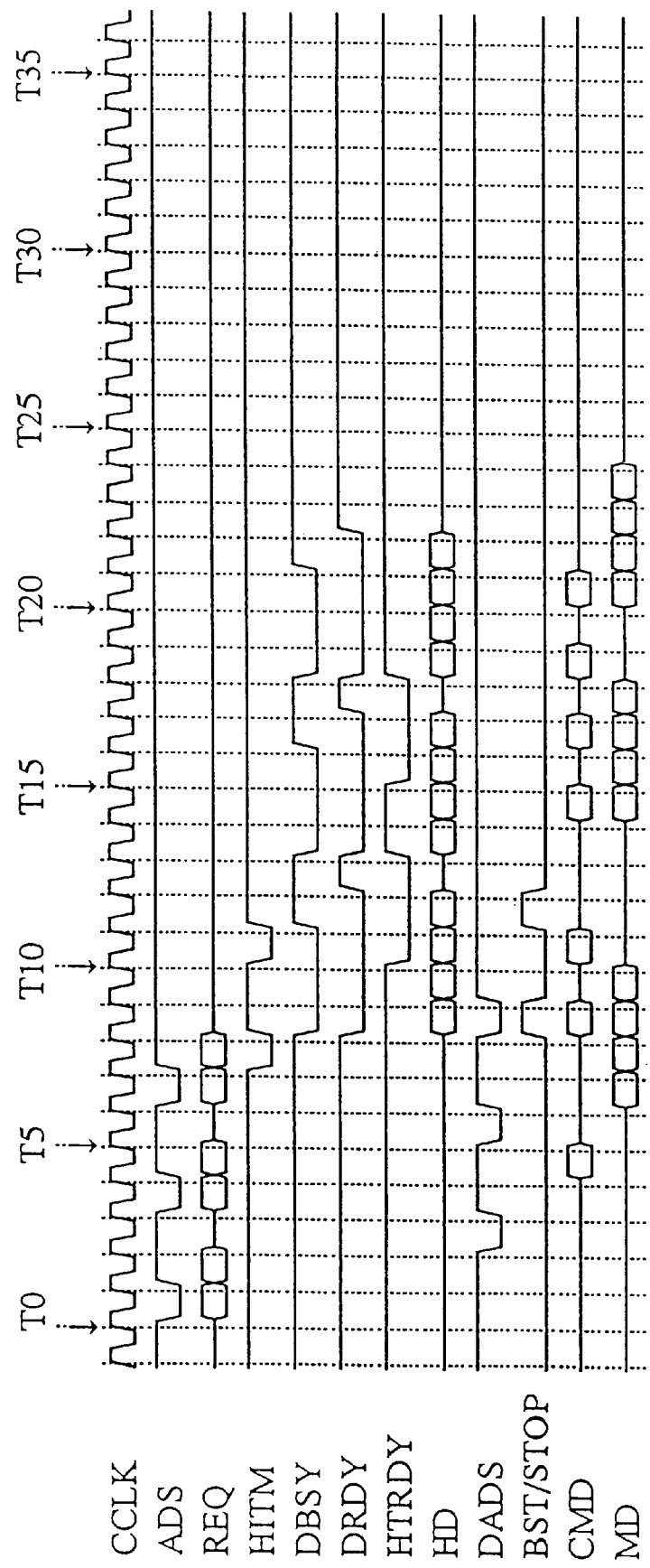
FIGS. 10 and 11 are timing diagrams showing the signal sequence on various signal lines that are related to the memory accessing and controlling unit of this invention when L1 write-back signals are submitted by the CPU.
Figure 11:
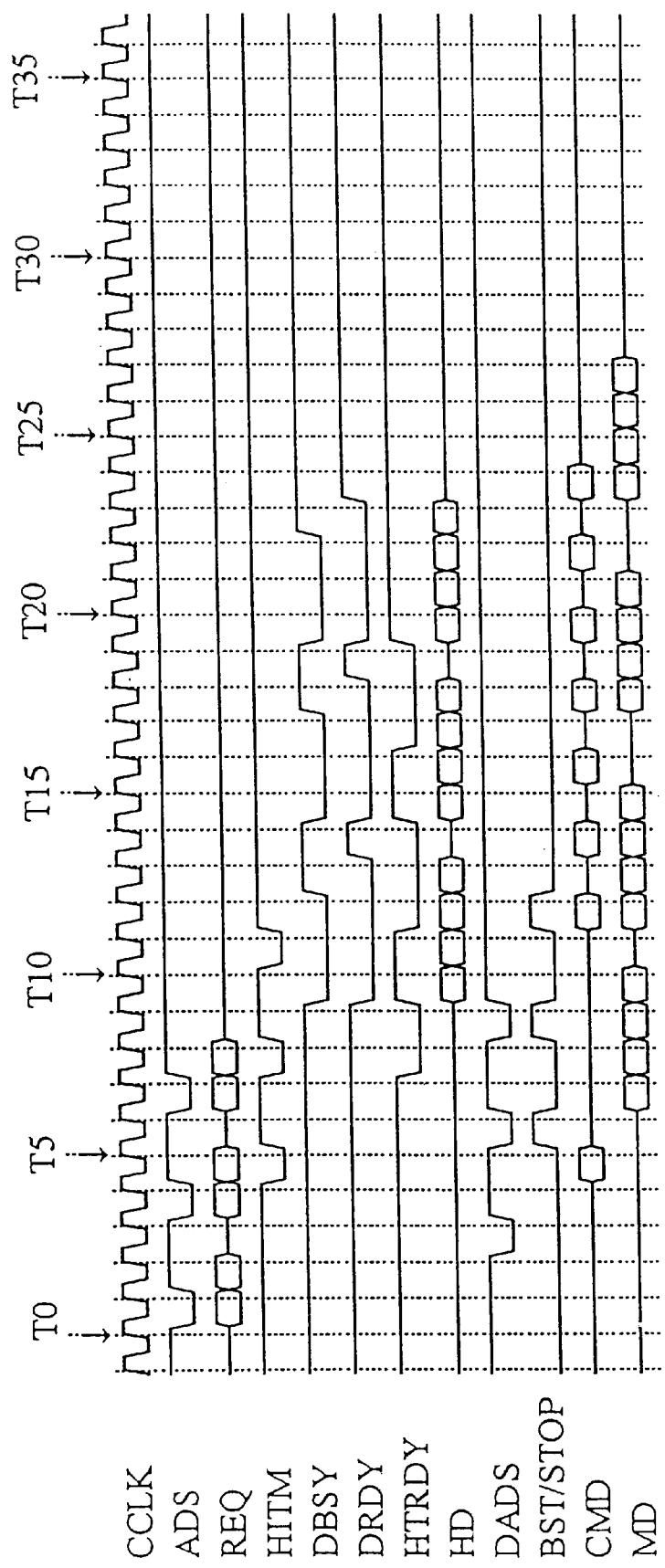

The above is a general description of the operations of a memory accessing and controlling unit according to this invention. To clarify the operation of the unit, specific examples employing a series of timing diagrams are next described. FIGS. 5A to 9A are timing diagrams of a conventional memory accessing and controlling unit under various operating conditions. FIGS. 5B to 9B are timing diagrams of the accessing and controlling unit of this invention under the same operating conditions as described in FIGS. 5A to 9A so that a comparison between the two can be made. In addition, FIGS. 10 and 11 are timing diagrams showing the signal sequence on various signal lines that are related to the memory accessing and controlling unit of this invention when L1 write-back signals are submitted by the CPU.

In the given batch of examples, a sequence of three consecutive data read requests are issued by the CPU 110. Furthermore, for each data request, the burst length is four consecutive sets of data, and the memory cluster has a latency period of two cycles. In addition, the CPU 110 issues an L1 write-back signal, if there is any, via the signal line HITM four cycles after the corresponding data read request signal issues from the CPU 110. In other words, whether changed data need to be written back from the cache to the memory cluster 130 is not known until four cycles after the data access request issues from the CPU 110. For example, if the CPU 110 issued three data read requests in cycles T1, T4 and T7, the first L1 write-back signal that corresponds to the first data read request in cycle T1 arrive in cycle T5. Furthermore, the L1 write-back signals for data read requests T4 and T7 have to come in cycles T8 and T11, respectively.

Figure 5A:
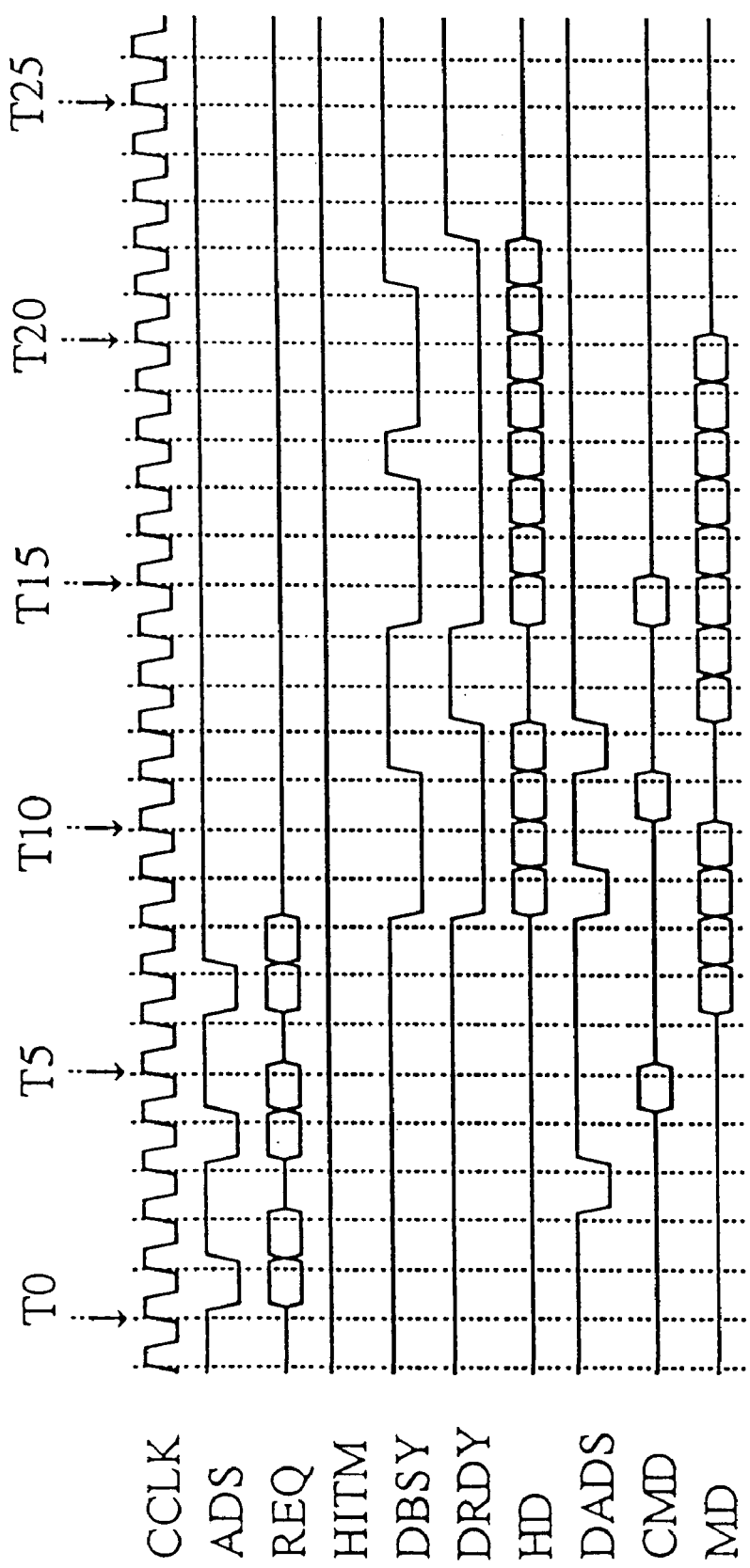
Figure 5B:
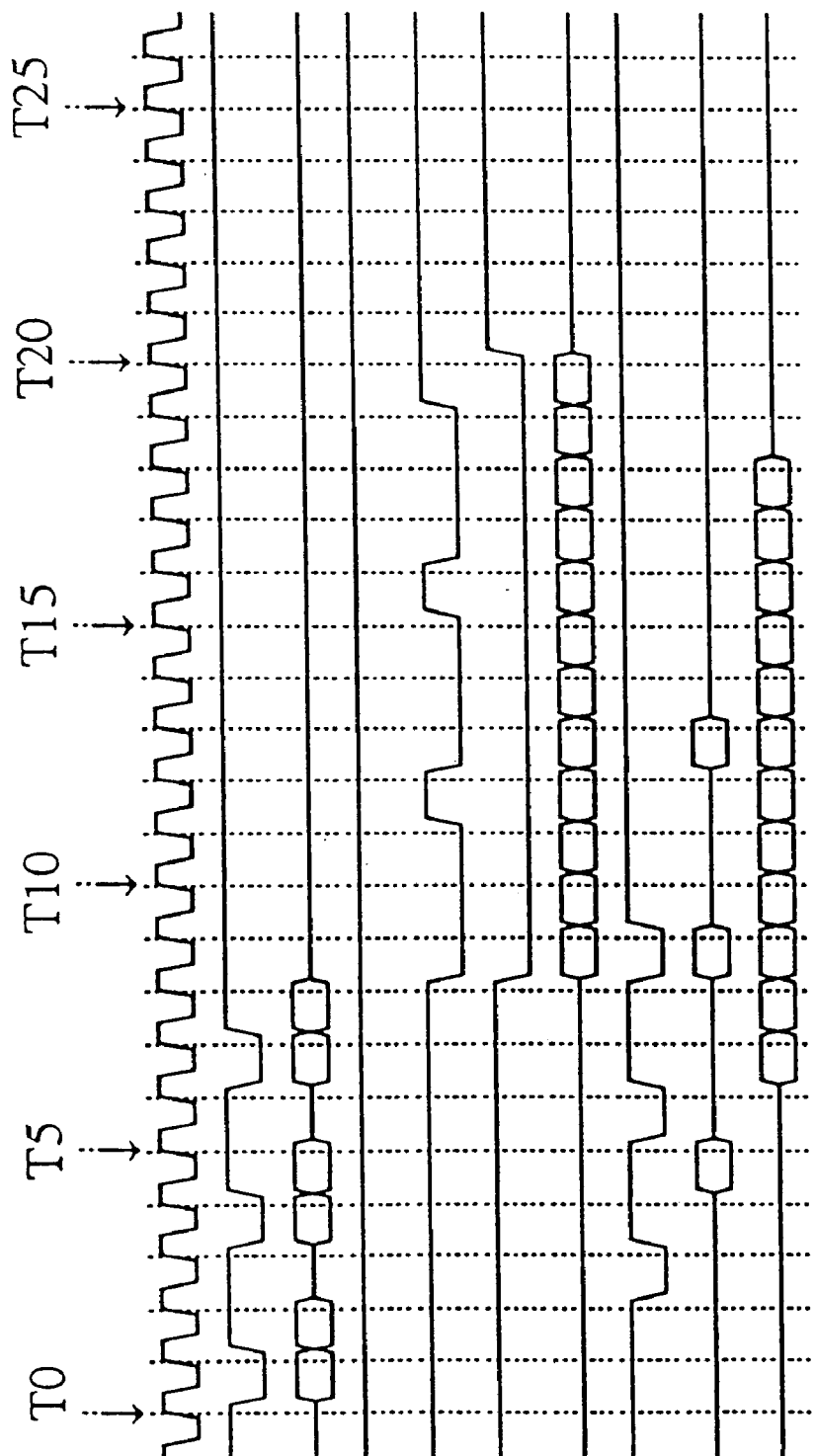

Timing diagrams shown in FIGS. 5A and 5B are waveforms derived from sending out three consecutive data read requests from the CPU 110. The data of all three requests happen to fall on the same open page in the memory cluster 130.

In the timing diagram of a conventional memory accessing and controlling unit 120 as shown in FIG. 5A, the CPU 110 sends out three consecutive data read requests during cycles T1, T4 and T7 via signal lines ADS and REQ. As soon as the CPU interface circuit 121 receives the consecutive data read requests from the CPU 110, a first internal data read request is submitted to the memory controlling circuit 122 via the signal line DADS in cycle T3. Here, in order to reduce an access delay in the timing diagram for easier descriptions, the first data request is assumed, for example, to be not a write-back request so that there is no need for the CPU interface circuit 121 to wait for the arrival of the first L1 write-back signal to confirm the operation. However, for the second and the third data read requests, the CPU interface circuit 121 must wait for a prescribed period to ensure that any L1 write-back signal is detected. That means, the second and the third internal data read requests are withheld until cycles T9 and T12, respectively.

As soon as the memory controlling circuit 122 picks up the first internal data read request signal from the CPU interface circuit 121, the address of the requested data is checked to make sure that the data lies on an open page in the memory cluster 130. Two cycles afterwards in cycle T5, a data read instruction is forwarded to the memory cluster 130 via the control line CMD. After two more cycles starting in cycle T7, the memory cluster 130 begins to return four sets of data to the memory controlling circuit 122 via the data lines MD. Similarly, when the memory controlling circuit 122 receives the second internal data read request signal in cycle T9, the address of the requested data is checked to be sure that the data also lies on an open page. Next, a data read instruction is forwarded to the memory cluster 130 via the control line CMD in cycle T11. Thereafter, sets of data are returned to the memory controlling circuit 122 starting from cycle T13. Finally, when the memory controlling circuit 122 receives the third internal data read request signal in cycle T12, the memory controlling circuit 122 has to forward the next instruction according to the control method of the memory cluster 130. For example, if the memory cluster 130 is a SDRAM, the memory controlling circuit 122 has to wait until the second-to-last set of data of the previous data access operations is issued by the SDRAM, then the next instruction is forwarded to the SDRAM. This means that the memory controlling circuit 122 has to wait until the second-to-last set of data of the previous data access request is returned to the memory controlling circuit 122. Thereafter, the third data read instruction is forwarded to the memory cluster 130 via the signal line CMD in cycle T15. Two more cycles later, starting in cycle T17, four sets of data that correspond to the third data read request are returned to the memory controlling circuit 122 via the data line MD.

In the timing diagram of the memory accessing and controlling unit 220 as shown in FIG. 5B, the CPU 110 similarly sends out three consecutive data read requests during cycles T1, T4 and T7 via signal lines ADS and REQ. As soon as the CPU interface circuit 221 picks up the first data read request, a first internal data read request is submitted to the memory controlling circuit 222 via the signal line DADS in cycle T3. When the CPU interface circuit 221 picks up the second data read request, the second internal data read request is forwarded to the memory controlling circuit 222 via the signal line DADS during the next cycle T6. There is no need for the CPU interface circuit 221 to wait for the return of the corresponding L1 write-back signal of the first data read request. Similarly, after the CPU interface circuit 221 picks up the third data read request, the third internal data read request is forwarded to the memory controlling circuit 222 via the signal line DADS during the next cycle T9.

As soon as the memory controlling circuit 222 picks up the first internal data read request signal from the CPU interface circuit 221, the address of the requested data is checked to make sure that the data lies on an open page in the memory cluster 130. Two cycles afterwards in cycle T5, a data read instruction is forwarded to the memory cluster 130 via the control line CMD. After two more cycles starting in cycle T7, the memory cluster 130 begins to return the first four sets of data to the memory controlling circuit 222 via the data lines MD. The memory controlling circuit 222 picks up the second internal data read request signal in cycle T6. Since the memory has not yet completed the previous read operation, the memory controlling circuit 222 has to wait for the end of the transmission of the second-to-last data set required by the first data read request of the CPU. Hence, the memory controlling circuit 222 is restrained from forwarding the second data read instruction to the memory cluster 130 until cycle T9. By the time the memory cluster 130 picks up the second read instruction via signal line CMD, all four sets of data required by the previous data request have just managed to slip through the data lines MD. Thus, starting in cycle T11, the data lines MD are again free to deliver another four sets of data that correspond to the second data read request. Similarly, the memory controlling circuit 222 picks up the third internal data read request during cycle T9. The memory controlling circuit 222 again has to wait for the end of the transmission of the second-to-last data set required by the second data read request of the CPU. Hence, the memory controlling circuit 222 is restrained from forwarding the third data read instruction to the memory cluster 130 until cycle T13. By the time the memory cluster 130 picks up the third read instruction via signal line CMD, all four sets of data required by the previous data request have just managed to slip through the data lines MD. Thus, starting in cycle T15, the data lines MD are again free to deliver another four sets of data that correspond to the third data read request.

As shown in FIG. 5A, a conventional memory accessing and controlling unit requires a total of 22 clock cycles to complete the three consecutive CPU data read requests. In comparison, the memory accessing and controlling unit of this invention requires only 20 clock cycles, as shown in FIG. 5B.

Figure 6A:
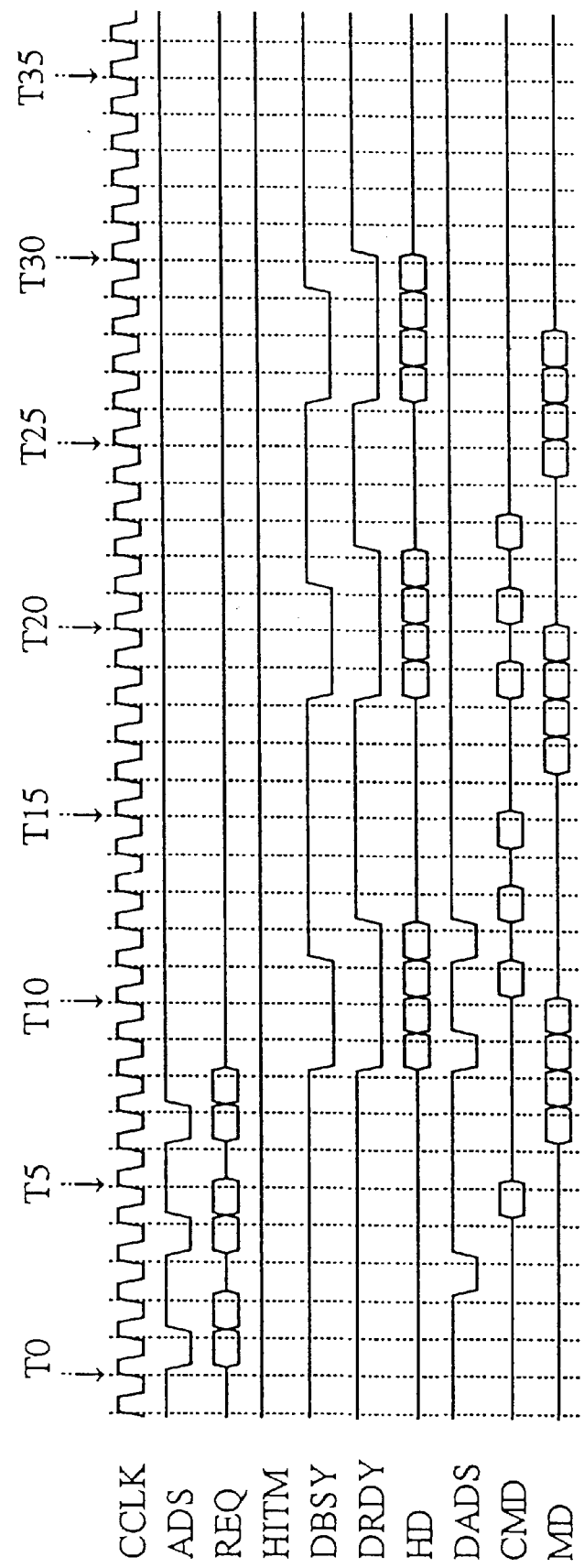
Figure 6B:
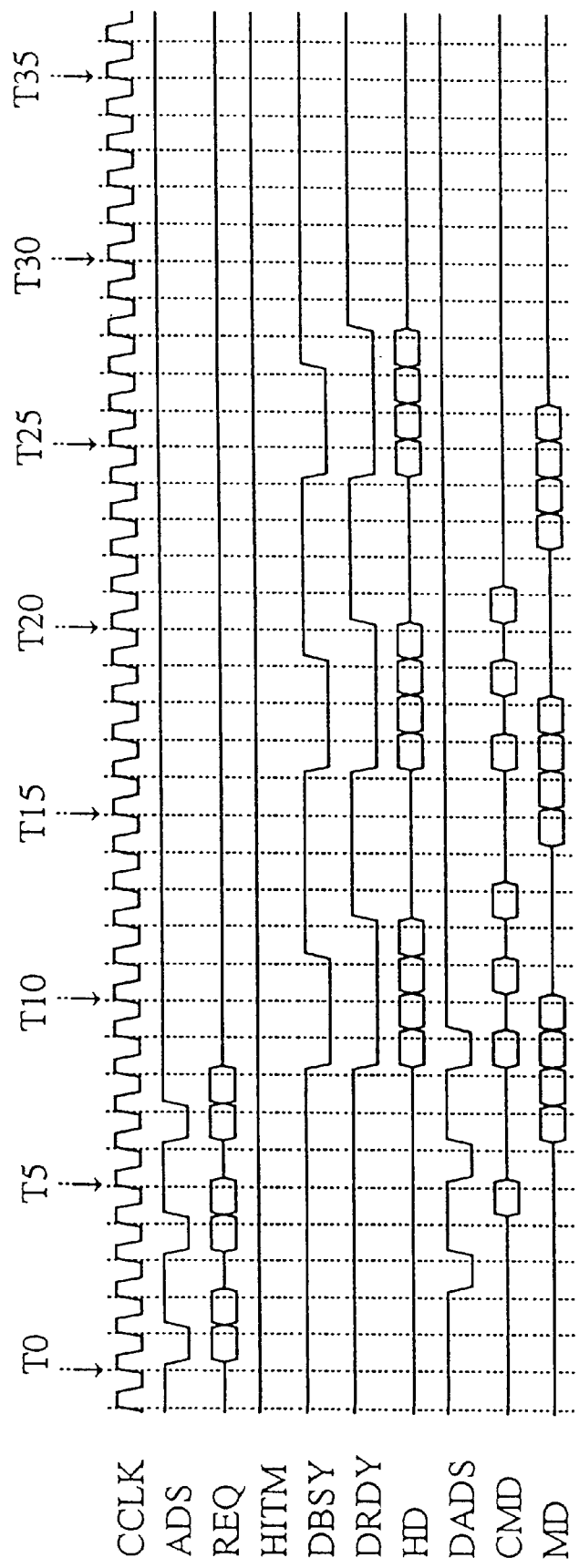

Timing diagrams shown in FIGS. 6A and 6B are waveforms derived from sending out three, consecutive data read requests from the CPU 110. The data requested by the first data read request lies on an opened page, whereas the data requested by the second and the third data read requests are on different pages (that is, both are on an off page).

In the timing diagram of a conventional memory accessing and controlling unit 120 as shown in FIG. 6A, the CPU 110 sends out three, consecutive data read requests during cycles T1, T4 and T7 via signal lines ADS and REQ. As soon as the CPU interface circuit 121 picks up the first data read request, a first internal data read request is submitted to the memory controlling circuit 122 via the signal line DADS in cycle T3. There is no need for the CPU interface circuit 121 to wait for the arrival of the first L1 write-back signal. However, for the second and the third data read requests, the CPU interface circuit 121 must wait for a prescribed period to ensure that any L1 write-back signal be detected. This means that the second and the third internal data read requests are withheld until cycles T9 and T12, respectively.

As soon as the memory controlling circuit 122 picks up the first internal data read request signal from the CPU interface circuit 121, the address of the requested data is checked to make sure that the data lies on an open page in the memory cluster 130. During cycle T5, a data read instruction is forwarded to the memory cluster 130 via the control line CMD. After two more cycles, starting in cycle T7, the memory cluster 130 begins to return four sets of data to the memory controlling circuit 122 via the data lines MD. When the memory controlling circuit 122 receives the second internal data read request signal in cycle T9, the requested data are found to be on an off page address. Therefore, a pre-charge signal, an activating signal and a data read instruction are forwarded to the memory cluster 130 via the control line CMD starting in cycle T11 to open the required page and reading from the memory cluster 130. Thereafter, sets of data are returned to the memory controlling circuit 122, starting from cycle T17. Finally, when the memory controlling circuit 122 receives the third internal data read request signal in cycle T12, the memory controlling circuit 122 has to wait until the previous data access operations are completed. That means, the memory controlling circuit 122 has to wait until the second-to-last set of data of the previous data access request is returned to the memory controlling circuit 122. Thereafter, the memory controlling circuit 122 forwards a pre-charge signal, an activating signal and a third data read instruction to the memory cluster 130 via the signal line CMD starting in cycle T19 to open up a new page and reading the required data. Two more cycles later, starting in cycle T25, four sets of data that correspond to the third data read request are returned to the memory controlling circuit 122 via the data line MD.

In the timing diagram of the memory accessing and controlling unit 220 as shown in FIG. 6B, the CPU 110 similarly sends out three consecutive data read requests during cycles T1, T4 and T7 via signal lines ADS and REQ. As soon as the CPU interface circuit 221 picks up the first data read request, a first internal data read request is submitted to the memory controlling circuit 222 via the signal line DADS in cycle T3. When the CPU interface circuit 221 picks up the second data read request, the second internal data read request is forwarded to the memory controlling circuit 222 via the signal line DADS during the next cycle T6. There is no need for the CPU interface circuit 221 to wait for the return of the corresponding L1 write-back signal of the first data read request. Similarly, after the CPU interface circuit 221 picks up the third data read request, the third internal data read request is forwarded to the memory controlling circuit 222 via the signal line DADS during the next cycle T9.

As soon as the memory controlling circuit 222 picks up the first internal data read request signal from the CPU interface circuit 221, the address of the requested data is checked to make sure that the data lies on an open page in the memory cluster 130. During cycle T5, a data read instruction is forwarded to the memory cluster 130 via the control line CMD. After two more cycles starting in cycle T7, the memory cluster 130 begins to return the first four sets of data to the memory controlling circuit 222 via the data lines MD. The memory controlling circuit 222 picks up the second internal data read request signal in cycle T6. The data requested by the second data read request are found to be on an off page address. Therefore, a new page has to be opened. Since the memory has not yet completed the previous read operation, the memory controlling circuit 222 has to wait for the end of the transmission of the second-to-last data set required by the first data read request of the CPU. Thus, the memory controlling circuit 222 does not forward a pre-charge signal, an activating signal and a second data read instruction to the memory cluster 130 to open up a new page and read the required data until cycle T9. Two more cycles later, starting in cycle T15, data required by the second data read request are returned via data lines MD. Similarly, the memory controlling circuit 222 picks up the third internal data read request during cycle T9. The memory controlling circuit 222 again has to wait for the end of the transmission of the second-to-last data set required by the second data read request of the CPU. Hence, the memory controlling circuit 222 does not forward a pre-charge signal, an activating signal and a third data read instruction to the memory cluster 130 to open up a new page and read the required data until cycle T17. Two cycles after the data read instruction issues, starting in cycle T23, the final four sets of data that correspond to the third data read request are delivered.

As shown in FIG. 6A, a conventional memory accessing and controlling unit requires a total of 30 clock cycles to complete the three consecutive CPU data read requests. In comparison, the memory accessing and controlling unit of this invention requires only 28 clock cycles as shown in FIG. 6B.

Figure 7A:
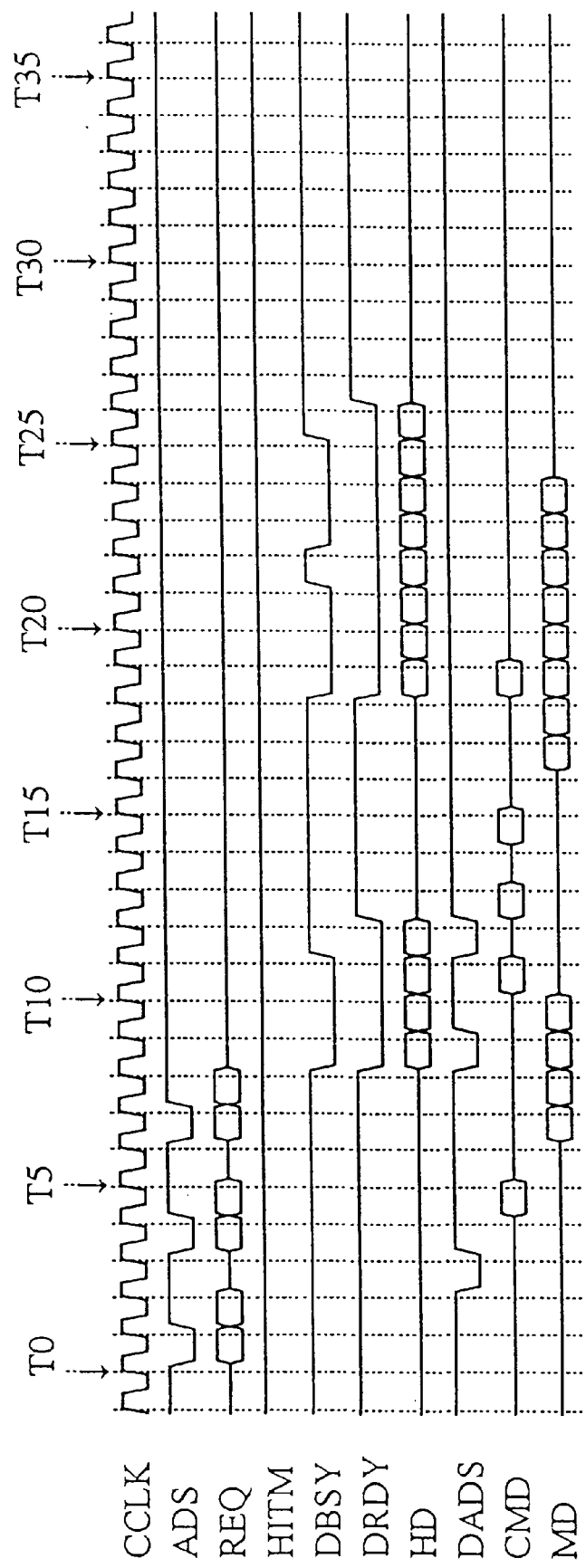
Figure 7B:
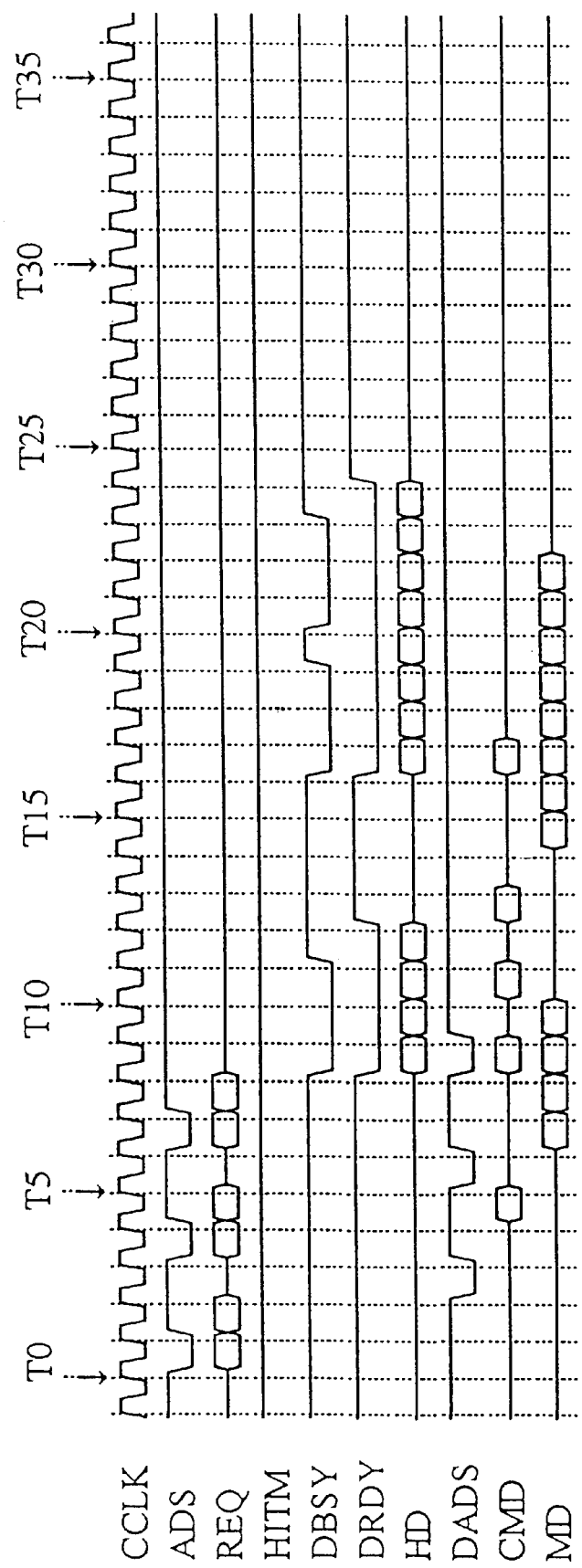

Timing diagrams shown in FIGS. 7A and 7B are waveforms derived from sending out three consecutive data read requests from the CPU 110. The data requested by the first data read request lies on an opened page, whereas the data requested by the second data read request lies on an off page. However, the data requested by the third data read request lies on the same page as the second data read request.

In the timing diagram of a conventional memory accessing and controlling unit 120 as shown in FIG. 7A, the CPU 110 sends out three consecutive data read requests during cycles T1, T4 and T7 via signal lines ADS and REQ. As soon as the CPU interface circuit 121 picks up the first data read request, a first internal data read request is submitted to the memory controlling circuit 122 via the signal line DADS in cycle T3. There is no need for the CPU interface circuit 121 to wait for the arrival of the first L1 write-back signal. However, for the second and the third data read requests, the CPU interface circuit 121 must wait for a prescribed period to ensure that any L1 write-back signal be detected. That means, the second and the third internal data read requests is withheld until cycles T9 and T12, respectively.

As soon as the memory controlling circuit 122 picks up the first internal data read request signal from the CPU interface circuit 121, the address of the requested data is checked to make sure that the data lies on an open page in the memory cluster 130. During cycle T5, a data read instruction is forwarded to the memory cluster 130 via the control line CMD. After two more cycles, starting in cycle T7, the memory cluster 130 begins to return four sets of data to the memory controlling circuit 122 via the data lines MD. When the memory controlling circuit 122 receives the second internal data read request signal in cycle T9, the requested data are found to be on an off page address. Therefore, a pre-charge signal, an activating signal and a data read instruction are forwarded to the memory cluster 130 via the control line CMD starting in cycle T11 to open the required page and reading from the memory cluster 130. Thereafter, sets of data are returned to the memory controlling circuit 122 via the data lines MD starting from cycle T17. Finally, when the memory controlling circuit 122 receives the third internal data read request signal in cycle T12, the memory controlling circuit 122 has to wait until the previous data access operations are completed. That means, the memory controlling circuit 122 has to wait until the second-to-last set of data of the previous data access request is returned to the memory controlling circuit 122. Thereafter, the memory controlling circuit 122 only has to forward a third data read instruction to the memory cluster 130 via the signal line CMD in cycle T19 for reading from the memory cluster 130 because the requested data falls on the same page. Two more cycles later, starting in cycle T21, four sets of data that correspond to the third data read request are returned to the memory controlling circuit 122 via the data line MD.

In the timing diagram of the memory accessing and controlling unit 220 as shown in FIG. 7B, the CPU 110 similarly sends out three consecutive data read requests during cycles T1, T4 and T7 via signal lines ADS and REQ. As soon as the CPU interface circuit 221 picks up the first data read request, a first internal data read request is submitted to the memory controlling circuit 222 via the signal line DADS in cycle T3. When the CPU interface circuit 221 picks up the second data read request, the second internal data read request are forwarded to the memory controlling circuit 222 via the signal line DADS during the next cycle T6. There is no need for the CPU interface circuit 221 to wait for the return of the corresponding L1 write-back signal of the first data read request. Similarly, after the CPU interface circuit 221 picks up the third data read request, the third internal data read request are forwarded to the memory controlling circuit 222 via the signal line DADS during the next cycle T9.

As soon as the memory controlling circuit 222 picks up the first internal data read request signal from the CPU interface circuit 221, the address of the requested data is checked to make sure that the data lies on an open page in the memory cluster 130. During cycle T5, a data read instruction is forwarded to the memory cluster 130 via the control line CMD. After two more cycles starting in cycle T7, the memory cluster 130 begins to return the first four sets of data to the memory controlling circuit 122 via the data lines MD. The memory controlling circuit 222 picks up the second internal data read request signal in cycle T6. The data requested by the second data read request are found to be on an off page address. Therefore, a new page has to be opened. Since the memory has not yet completed the previous read operation, the memory controlling circuit 222 has to wait for the end of the transmission of the second-to-last data set required by the first data read request of the CPU. Thus, the memory controlling circuit 222 does not forward a pre-charge signal, an activating signal and a second data read instruction to the memory cluster 130 to open up a new page and reading the required data until cycle T9. Two more cycles later, starting in cycle T15, data required by the second data read request are returned via data lines MD. Similarly, the memory controlling circuit 222 picks up the third internal data read request during cycle T9. The memory controlling circuit 222 again has to wait for the end of the transmission of the second-to-last data set required by the second data read request of the CPU. Thereafter, the memory controlling circuit 222 only has to forward a third data read instruction to the memory cluster 130 via the signal line CMD in cycle T17 for reading from the memory cluster 130 because the requested data falls on the same page. Two cycles after the data read instruction issues, starting in cycle T19, the final four sets of data that correspond to the third data read request are delivered.

As shown in FIG. 7A, a conventional memory accessing and controlling unit requires a total of 26 clock cycles to complete the three consecutive CPU data read requests. In comparison, the memory accessing and controlling unit of this invention requires only 24 clock cycles as shown in FIG. 7B.

Figure 8A:
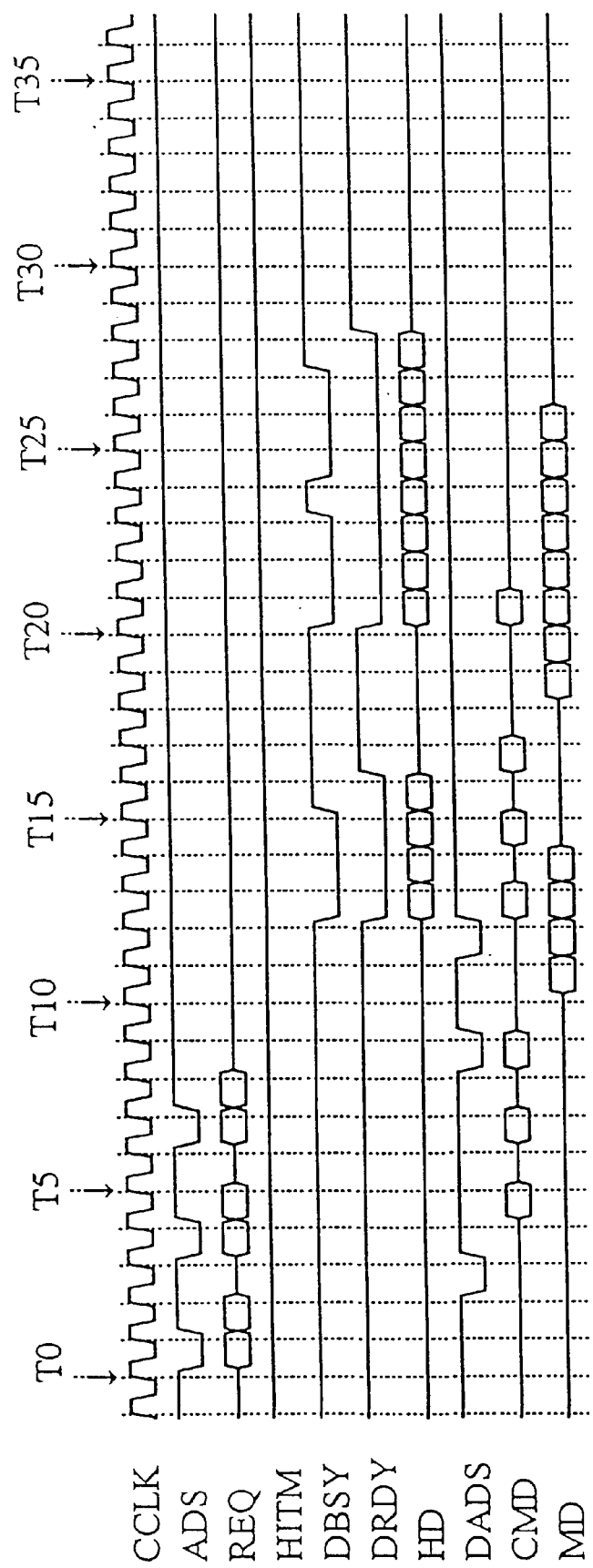
Figure 8B:
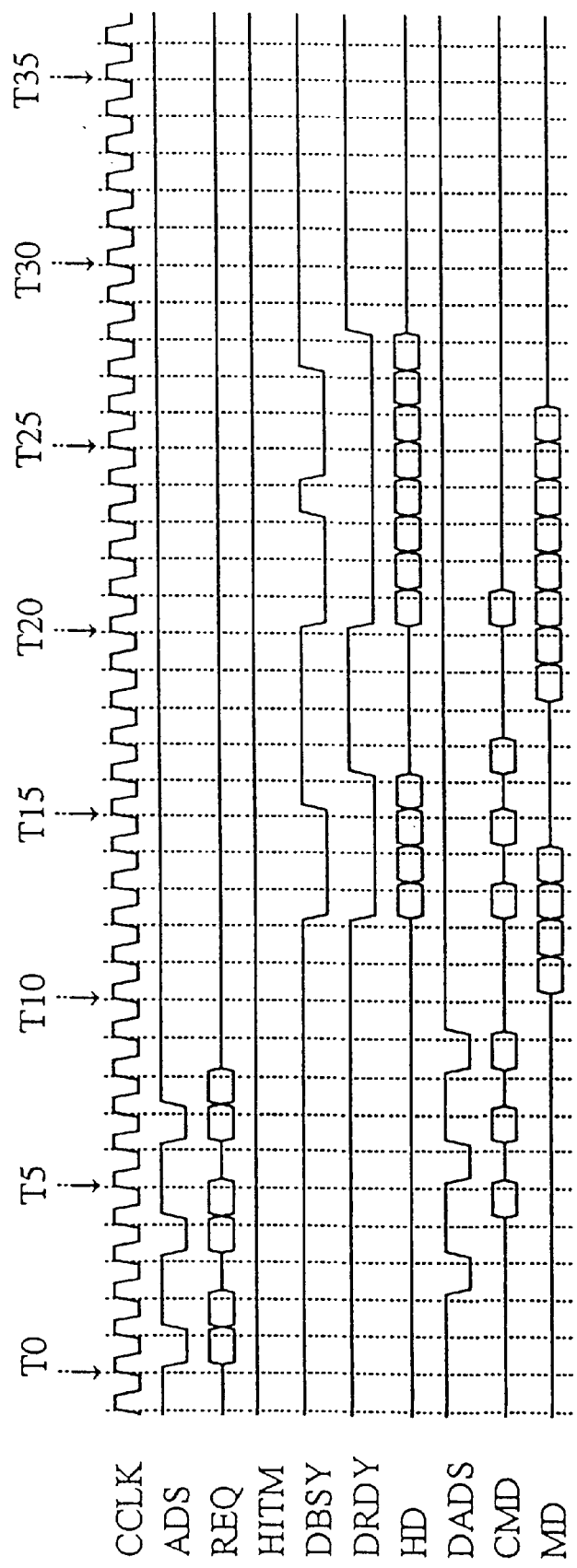

Timing diagrams shown in FIGS. 8A and 8B are waveforms derived from sending out three consecutive data read requests from the CPU 110. The data requested by the first and the second data read requests are on off pages. However, the data requested by the third data read request lies on the same page as in the data requested by the second data read request.

In the timing diagram of a conventional memory accessing and controlling unit 120 as shown in FIG. 8A, the CPU 110 sends out three consecutive data read requests during cycles T1, T4 and T7 via signal lines ADS and REQ. As soon as the CPU interface circuit 121 picks up the first data read request, a first internal data read request is submitted to the memory controlling circuit 122 via the signal line DADS in cycle T3. There is no need for the CPU interface circuit 121 to wait for the arrival of the first L1 write-back signal. However, for the second and the third data read requests, the CPU interface circuit 121 has to wait for a prescribed period to ensure that any L1 write-back signal is detected. That means, the second and the third internal data read requests are withheld until cycles T9 and T12, respectively.

As soon as the memory controlling circuit 122 picks up the first internal data read request signal from the CPU interface circuit 121, the requested data are found to be on an off page in the memory cluster 130. Hence, starting in cycle T5, a pre-charge signal, an activating signal and a data read instruction are forwarded to the memory cluster 130 via the control line CMD. After two more cycles starting in cycle T11, the memory cluster 130 begins to return four sets of data to the memory controlling circuit 122 via the data lines MD. When the memory controlling circuit 122 receives the second internal data read request signal in cycle T9, the requested data are again found to be on an off page. Therefore, a pre-charge signal, an activating signal and a data read instruction are forwarded to the memory cluster 130 via the control line CMD starting in cycle T13 to open the required page and read from the memory cluster 130. Thereafter, sets of data are returned to the memory controlling circuit 122 via the data lines MD starting from cycle T19. Finally, when the memory controlling circuit 122 receives the third internal data read request signal in cycle T12, the memory controlling circuit 122 has to wait until the previous data access operations are completed. That means, the memory controlling circuit 122 has to wait until the second-to-last set of data of the previous data access request is returned to the memory controlling circuit 122. Thereafter, the memory controlling circuit 122 only has to forward a third data read instruction to the memory cluster 130 via the signal line CMD in cycle T21 for reading from the memory cluster 130 because the requested data falls on the same page. Two more cycles later, starting in cycle T23, four sets of data that correspond to the third data read request are returned to the memory controlling circuit 122 via the data line MD.

In the timing diagram of the memory accessing and controlling unit 220 as shown in FIG. 8B, the CPU 110 similarly sends out three consecutive data read requests during cycles T1, T4 and T7 via signal lines ADS and REQ. As soon as the CPU interface circuit 221 picks up the first data read request, a first internal data read request is submitted to the memory controlling circuit 222 via the signal line DADS in cycle T3. When the CPU interface circuit 221 picks up the second data read request, the second internal data read request is forwarded to the memory controlling circuit 222 via the signal line DADS during the next cycle T6. There is no need for the CPU interface circuit 221 to wait for the return of the corresponding L1 write-back signal of the first data read request. Similarly, after the CPU interface circuit 221 picks up the third data read request, the third internal data read request is forwarded to the memory controlling circuit 222 via the signal line DADS during the next cycle T9.

As soon as the memory controlling circuit 222 picks up the first internal data read request signal from the CPU interface circuit 221, the requested data are found to be on an off page in the memory cluster 130. Hence, starting in cycle T5, a pre-signal, an activating signal and a data read instruction are forwarded to the memory cluster 130 via the control line CMD. After two more cycles starting in cycle T11, the memory cluster 130 begins to return the first four sets of data to the memory controlling circuit 222 via the data lines MD. The memory controlling circuit 222 picks up the second internal data read request signal in cycle T6. The requested data of the second data read request is again found to be on an off page. Therefore, a new page has to be opened. Since the memory has not yet completed the previous read operation, the memory controlling circuit 222 has to wait for the end of the transmission of the second-to-last data set required by the first data read request of the CPU. Thus, the memory controlling circuit 222 does not forward a pre-charge signal, an activating signal and a second data read instruction to the memory cluster 130 to open up a new page and reading the required data until cycle T13. Later, starting in cycle T19, data required by the second data read request are returned via data lines MD. Similarly, the memory controlling circuit 222 picks up the third internal data read request during cycle T9. The memory controlling circuit 222 again has to wait for the end of the transmission of the second-to-last data set required by the second data read request of the CPU. Thereafter, the memory controlling circuit 122 only has to forward a third data read instruction to the memory cluster 130 via the signal line CMD in cycle T21 for reading from the memory cluster 130 because the requested data falls on the same page. Two cycles after the data read instruction issues, starting in cycle T23, the final four sets of data that correspond to the third data read request are delivered.

As shown in FIG. 8A and FIG. 8B, both the conventional memory accessing and controlling unit and the memory accessing and controlling unit of this invention requires a total of 28 clock cycles to complete the three consecutive CPU data read requests.

Figure 9A:
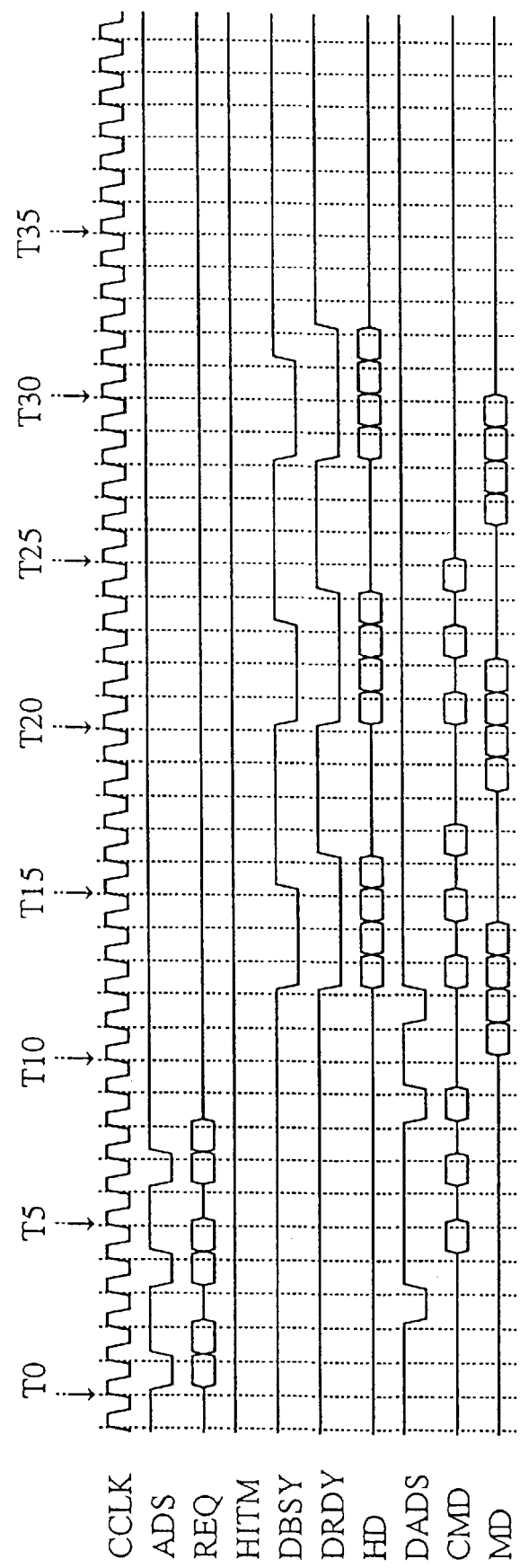
Figure 9B:
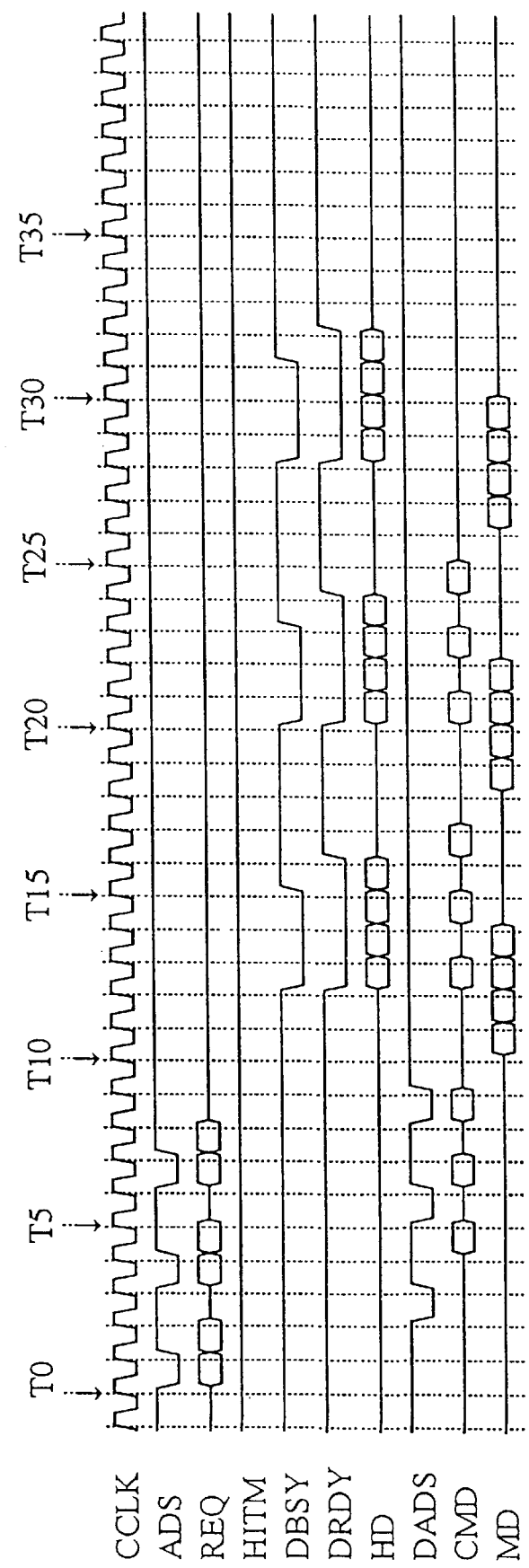

Timing diagrams shown in FIGS. 9A and 9B are waveforms derived from sending out three consecutive data read requests from the CPU 110. The data requested by the first, the second and the third data read requests are all on off pages.

In the timing diagram of a conventional memory accessing and controlling unit 120 as shown in FIG. 8A, the CPU 110 sends out three consecutive data read requests during cycles T1, T4 and T7 via signal lines ADS and REQ. As soon as the CPU interface circuit 121 picks up the first data read request, a first internal data read request is submitted to the memory controlling circuit 122 via the signal line DADS in cycle T3. There is no need for the CPU interface circuit 121 to wait for the arrival of the first L1 write-back signal. However, for the second and the third data read requests, the CPU interface circuit 121 must wait for a prescribed period to ensure that any L1 write-back signal detected. That means, the second and the third internal data read requests are withheld until cycles T9 and T12, respectively.

As soon as the memory controlling circuit 122 picks up the first internal data read request signal from the CPU interface circuit 121, the requested data are found to be on an off page in the memory cluster 130. Hence, starting in cycle T5, a pre-charge signal, an activating signal and a data read instruction are forwarded to the memory cluster 130 via the control line CMD. After two more cycles starting in cycle T11, the memory cluster 130 begins to return four sets of data to the memory controlling circuit 122 via the data lines MD. When the memory controlling circuit 122 receives the second internal data read request signal in cycle T9, the requested data are again found to be on an off page. Therefore, a pre-charge signal, an activating signal and a data read instruction are forwarded to the memory cluster 130 via the control line CMD starting in cycle T13 to open the required page and read from the memory cluster 130. Thereafter, sets of data are returned to the memory controlling circuit 122 via the data lines MD starting from cycle T19. Finally, when the memory controlling circuit 122 receives the third internal data read request signal in cycle T12, the memory controlling circuit 122 has to wait until the previous data access operations are completed. This means that the memory controlling circuit 122 has to wait until the second-to-last set of data of the previous data access request is returned to the memory controlling circuit 122. Since the requested data are yet again found to be on an off page, the memory controlling circuit 122 only has to forward a pre-charge signal, an activating signal and a third data read instruction to the memory cluster 130 via the signal line CMD starting in cycle T21 to open up a new page and read from the memory cluster 130. Two more cycles later, starting in cycle T27, four sets of data that correspond to the third data read request are returned to the memory controlling circuit 122 via the data line MD.

In the timing diagram of the memory accessing and controlling unit 220 as shown in FIG. 9B, the CPU 110 similarly sends out three consecutive data read requests during cycles T1, T4 and T7 via signal lines ADS and REQ. As soon as the CPU interface circuit 221 picks up the first data read request, a first internal data read request is submitted to the memory controlling circuit 222 via the signal line DADS in cycle T3. When the CPU interface circuit 221 picks up the second data read request, the second internal data read request is forwarded to the memory controlling circuit 222 via the signal line DADS during the next cycle T6. There is no need for the CPU interface circuit 221 to wait for the return of the corresponding L1 write-back signal of the first data read request. Similarly, after the CPU interface circuit 221 picks up the third data read request, the third internal data read request be forwarded to the memory controlling circuit 222 via the signal line DADS during the next cycle T9.

As soon as the memory controlling circuit 222 picks up the first internal data read request signal from the CPU interface circuit 221, the requested data are found to be on an off page in the memory cluster 130. Hence, starting in cycle T5, a pre-signal, an activating signal and a data read instruction are forwarded to the memory cluster 130 via the control line CMD. After two more cycles, starting in cycle T11, the memory cluster 130 begins to return the first four sets of data to the memory controlling circuit 222 via the data lines MD. The memory controlling circuit 222 picks up the second internal data read request signal in cycle T6. The data requested by the second data read request is again found to be on an off page. Therefore, a new page has to be opened. Since the memory has not completed the previous read operation yet, the memory controlling circuit 222 has to wait for the end of the transmission of the second-to-last data set required by the first data read request of the CPU. Thus, the memory controlling circuit 222 does not forward a pre-charge signal, an activating signal and a second data read instruction to the memory cluster 130 to open up a new page and reading the required data until cycle T13. Later, starting in cycle T19, data required by the second data read request are returned via data lines MD. Similarly, the memory controlling circuit 222 picks up the third internal data read request during cycle T9. The memory controlling circuit 222 again has to wait for the end of the transmission of the second-to-last data set required by the second data read request of the CPU. Since the requested data are yet again found to be on an off page, the memory controlling circuit 222 only has to forward a pre-charge signal, an activating signal and a third data read instruction to the memory cluster 130 via the signal line CMD starting in cycle T21 to open up a new page and read from the memory cluster 130. Two cycles after the data read instruction issues, starting in cycle T27, the final four sets of data that correspond to the third data read request are delivered.

As shown in FIG. 9A and FIG. 9B, both the conventional memory accessing and controlling unit and the memory accessing and controlling unit of this invention requires a total of 31 clock cycles to complete the three consecutive CPU data read requests.

FIGS. 5A through 9A and FIGS. 5B through 9B compare the timing sequence of various signals between a conventional memory accessing and controlling unit and a memory accessing and controlling unit of this invention. According to the method of operation in this invention, the internal data read request signals are issued before the CPU 110 forwards any L1 write-back signals to the CPU interface circuit. In the following, a situation, in which L1 write-back signals from the CPU 110 arrives requesting the writing of data back to the memory cluster 130 after the internal data read requests are issued from the CPU interface circuit, is discussed.

The timing diagram in FIG. 10 shows that three consecutive data read requests are sent by the CPU 110. Among the three requests, the second and the third data requests have to perform write-back operations as demanded by the CPU 110. Furthermore, the data of the first data read request lies on an open page while the data of the second and the third data read requests lie on separate pages.

As shown in FIG. 10, the CPU 110 submits three consecutive data read request signals during cycles T1, T4 and T7, respectively. The CPU 110 also submits a first L1 write-back signal for the second data read request via the signal line HITM in cycle T8. The write-back data that correspond to the first L1 write-back signal are transferred to the CPU interface circuit 221 via data lines HD starting from cycle T14. In addition, the CPU 110 also submits a second L1 write-back signal for the third data read request via the signal line HITM in cycle T1. The write-back data that correspond to the second L1 write-back signal are transferred to the CPU interface circuit 221 via data lines HD starting from cycle T19.

When the CPU interface circuit 221 picks up the first data request signal, the first internal data read request signal is forwarded to the memory controlling circuit 222 via the signal line DADS in cycle T3. Thereafter, as soon as the CPU 110 sends out the second data read request signal via the signal lines ADS and REQ, the second internal data read request signal issues to the memory controlling circuit 222 via the signal line DADS in cycle T6 without waiting for the arrival of an L1 write-back signal. Similarly, on receiving the third data read request signal, the third internal data read request signal issues to the memory controlling circuit 222 via the signal line DADS in cycle T9. Although the CPU interface circuit 221 responds by submitting internal data read requests immediately after data read requests are received, the CPU interface circuit 221 also receives L1 write-back signals, later on. Consequently, after the CPU interface circuit 221 picks up the L1 write-back signal that corresponds to the second data read request signal from the CPU 110 in cycle T8, a stop signal is forwarded to the memory controlling circuit 222 via the signal line BST/STOP in the next cycle T9. Similarly, after the CPU interface circuit 221 picks up the L1 write-back signal that corresponds to the third data read request signal from the CPU 110 in cycle T11, a stop signal is forwarded to the memory controlling circuit 222 via the signal line BST/STOP in the next cycle T12.

On the other hand, after the memory controlling circuit 222 picks up the first internal read request signal, the first read instruction is directly sent to the memory cluster 130 via the control line CMD in cycle T5 because the data lies on an open page. Thereafter, data required by the first data read request are returned to the memory controlling circuit 222 via data lines MD, starting in cycle T7. However, before the transfer of data through the data lines MD, the memory controlling circuit 222 has already received the second internal data read request signal in cycle T6. Later, in cycle T9, the stop signal for the second data read request also arrives. In addition, since the data required by the second data read request lies on an off page, a pre-charge signal and an activating signal must be issued from the memory controlling circuit 222 when the second-to-last set of data is being returned from the memory cluster 130. In other words, the relevant signals to open up a new page in the memory cluster 130 must issue starting in cycle T9. Next, the memory controlling circuit 222 has to wait until the CPU 110 has completely transmitted the write-back data to the memory controlling circuit 222 in cycle T14. Thereafter, starting in cycle T15, a write instruction is sent to the memory cluster 130 for writing back data to the memory cluster 130.

The memory controlling circuit 222 receives the third internal data read request and its corresponding stop signal during cycles T9 and T12, respectively. However, a pre-charge signal, an activating signal and a write instruction cannot be sent to the memory cluster 130 to open up a new page and write data into the memory cluster 130 until cycle T17 arrives. This is because the memory controlling circuit 222 must wait until the second-to-last set of data of a previous request is written back to the memory cluster 130.

The timing diagram in FIG. 11 shows that three consecutive data read requests are sent by the CPU 110. However, the CPU 110 demands a write-back operation for all three requests. In addition, the data of the first data read request lies on an open page while the data of the second and the third data read requests lie on separate pages.

As shown in FIG. 11, the CPU 110 submits three, consecutive data read request signals during cycles T1, T4 and T7, respectively. The CPU 110 also submits three L1 write-back signals that correspond to the three data read requests via signal line HITM during cycles T5, T8 and T11. The write-back data are forwarded to the CPU interface circuit 221 via data lines HD in three periods starting in cycles T10, T15 and T20, respectively.

When the CPU interface circuit 221 picks up the first data read request signal, the first internal data read request signal is forwarded to the memory controlling circuit 222 via the signal line DADS in cycle T3. Thereafter, as soon as the CPU 110 sends out the second data read request signal via the signal lines ADS and REQ, the second internal data read request signal issues to the memory controlling circuit 222 via the signal line DADS in cycle T6 without waiting for the arrival of an L1 write-back signal. Similarly, on receiving the third data read request signal, the third internal data read request signal issues to the memory controlling circuit 222 via the signal line DADS in cycle T9. Since the CPU 110 also submits three L1 write-back signals that correspond to the three data read requests via signal line HITM during cycles T5, T8 and T11, stop signals are sent to the memory controlling circuit 222 via the signal line BST/STOP during their next cycles, namely, T6, T9 and T12.

In the meantime, after the memory controlling circuit 222 picks up the first internal read request signal, the first read instruction is directly sent to the memory cluster 130 via the control line CMD in cycle T5 because the data lies on an open page and the first L1 write-back signal has not yet arrived. Thereafter, four sets of data required by the first data read request should be returned to the memory controlling circuit 222 via data lines MD starting in cycle T7. However, the memory controlling circuit 222 receives the first stop signal that corresponds to the first data read request from the CPU interface circuit 221 in cycle T6. Hence, the read-out data from the memory cluster 130 are discarded. Next, a write-back instruction is sent to the memory cluster 130 for writing data into the memory cluster 130 via the signal line CMD in T12.

Since the memory controlling circuit 222 has already picked up the second and the third stop signals that correspond to the second and the third data read requests when the first write-back data that correspond to the first data read request are being written back to the memory cluster 130, the second and the third write-back data can be written back to the memory cluster 130 in sequence. Because the data required by the second and the third data read requests lie on different memory pages, the memory controlling circuit 222 has to wait until the second-to-last set of write-back data that corresponds to the first data read request has finished writing to the memory cluster 130. Thereafter, in cycle T14, a pre-charge signal, an activating signal and a write instruction are sent to the memory cluster via the signal line CMD to open up the required memory page and instructing the memory cluster 130 to receive the write-back data that correspond to the second L1 write-back signal. Similarly, the memory controlling circuit 222 has to wait until the second-to-last set of write-back data that corresponds to the second data read request has finished writing to the memory cluster 130. Thereafter, in cycle T20, a pre-charge signal, an activating signal and a write instruction are sent to the memory cluster via the signal line CMD to open up the required memory page and instructing the memory cluster 130 to receive the write-back data that correspond to the third L1 write-back signal.

The memory accessing and controlling unit of this invention permits the sending of consecutive data read requests from the CPU 110 without having to wait for the subsequent return of the corresponding L1 write-back signals from the CPU 110. Hence, the memory cluster is well prepared for data reading. In case any L1 write-back signals do arrive later, reading operations can be promptly terminated without any side effects so that write-back data from the CPU can be easily written into the memory cluster.

In summary, the memory accessing and controlling unit of this invention has a higher operating efficiency than a conventional unit because the unit does not have to wait for L1 write-back signals coming from the CPU. Since most operations between a CPU and its memory within a computer system involve reading data from the memory, improving efficiency of memory read operations improves the operating efficiency of the entire computer system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory access control system for controlling a memory access operation suitable for use between a CPU and a memory unit, wherein the CPU can issue a read request and issue an L1 write-back signal after a predetermined time to indicate that a write back operation is desired, the memory access control system comprising:

a CPU interface circuit coupled to the CPU, wherein when the CPU interface circuit receives the read request from the CPU, an internal read request is issued without waiting for the L1 write-back signal, wherein when the CPU interface circuit receives the L1 write-back signal, a read-stop signal is promptly issued; and a memory control unit coupled between the CPU interface circuit and the memory unit, wherein when the memory control unit receives the internal read request from the CPU interface circuit, a read operation is accordingly performed, and when the memory control unit receives the read-stop signal, the read operation stops and the write back operation accordingly starts.

2. The system of claim 1, wherein when the read operation stops, read-out data from the memory unit are discarded.

3. The system of claim 1, wherein the memory cluster includes a synchronous dynamic random access memory (SDRAM).

4. The system of claim 1, wherein when the memory control unit receives the internal read request, the internal read request is activated after a previous data access operation is complete.

5. The system of claim 1, wherein the read-stop signal is issued at a next clock cycle when the CPU interface circuit receives the L1 write-back signal.

6. A memory access control method suitable for controlling a CPU to access data in a memory unit, wherein a read request is issued by the CPU and an L1 write-back signal is also issued after a certain period of time if a write-back operation is desired, the memory access control method comprising:

performing an internal data reading operation without waiting for the L1 write-back signal when the read request is received;

promptly issuing a read-stop signal when the L1 write-back signal is received; and stopping the current internal data reading operation when the L1 write-back signal is issued and received.

7. The method of claim 5, further comprising:

discarding read-out data by the internal data reading operation after the step of stopping the current internal data reading operation; and performing the write-back operation.

8. The method of claim 5, wherein the read-stop signal is issued at a next clock cycle when the L1 write-back signal is received.

* * * * *